United States Patent [19]

Pensabene et al.

[11] Patent Number: 5,466,546
[45] Date of Patent: Nov. 14, 1995

[54] POSITIVE NICKEL ELECTRODE FOR NICKEL METAL HYDRIDE CELLS

[75] Inventors: Saverio F. Pensabene; Vincent J. Puglisi, both of Gainsville, Fla.

[73] Assignee: Eveready Battery Company, Inc., St. Louis, Mo.

[21] Appl. No.: 24,148

[22] Filed: Mar. 1, 1993

[51] Int. Cl.$^6$ ..................................................... H01M 4/32
[52] U.S. Cl. ........................................... 429/223; 429/218
[58] Field of Search ................................... 429/218, 223, 429/101, 206

[56] References Cited

U.S. PATENT DOCUMENTS 4,216,274  8/1980  Brunning et al. ................ 429/101 X
4,935,318  6/1990  Ikoma et al. ........................ 429/206
5,032,475  7/1991  Hasebe et al. .................. 429/223 X Primary Examiner—Anthony Skapars
Attorney, Agent, or Firm—Robert W. Welsh

[57] ABSTRACT

A positive electrode for use in a rechargeable nickel metal hydride cell and method of manufacture is disclosed. The electrode includes an electrically conductive substrate and an electrochemically active material. The active material includes nickel hydroxide carried by the substrate. A calcium-containing compound is deposited onto the active material to coat the active material with calcium.

13 Claims, 1 Drawing Sheet

POSITIVE NICKEL ELECTRODE FOR NICKEL METAL HYDRIDE CELLS

BACKGROUND OF THE INVENTION

1. Field of the Invention

This invention relates generally to nickel hydroxide containing electrodes for use in a rechargeable cell and, more particularly, to positive nickel hydroxide electrodes having enhanced nickel hydroxide utilization for use in nickel metal hydride cells. Specifically, the present invention relates to nickel hydroxide positive electrodes for use in nickel metal hydride electrochemical cells particularly of the AB5-type.

2. Description of the Prior Art

Sealed or semi-sealed nickel metal hydride alkaline cells employ hydrogen storage alloy materials as the electrochemically active material for the negative electrode. These alloy materials are believed to possess catalytically active sites for disassociating hydrogen molecules to increase the rate at which hydrogen absorption and desorption can be accomplished. Cells made with these hydrogen storage alloy materials forming the basis of the negative electrode are typically matched against nickel positive electrodes with alkaline electrolyte in a sealed configuration operating in some respects analogously to the nickel-cadmium cell.

The metal hydride electrodes may be of the pasted or compressed powdered type as well as a sintered type. Sintered nickel containing electrodes, and in particular positive nickel hydroxide electrodes, are typically formed by sintering nickel powder at elevated temperatures and then impregnating the porous sintered structure with the active nickel hydroxide material as well as other materials. Pressed or extruded paste nickel hydroxide electrodes are produced by physically depositing and then pressing the active nickel hydroxide material and other active materials into contact with an appropriate current collector substrate. In each of these types of electrodes typically used in rechargeable electrochemical cells, the principal active material comprises nickel hydroxide as a main constituent. In order to adhere the active material to the current collector substrate in the pasted type of electrode, additional materials such as organic binders, i.e., polyacrylate and polytetrafluoroethylene, may be utilized, as well as conductive diluents such as graphite powder or fibers or nickel powder.

There are a wide variety of prior art references that discuss or address nickel metal hydride cells in general as well as regarding particular aspects thereof. U.S. Pat. No. 4,820,481, for example, illustrates a method for the continuous fabrication of negative electrodes for use in such cells. U.S. Pat. No, 2,724,733 discloses a sintered electrode structure for a nickel cadmium cell having nickel hydroxide as the active material for the sintered positive electrode. U.S. Pat. No. 3,826,684 also discloses a nickel cadmium cell having a positive nickel hydroxide electrode containing additives to enhance storage capacity. These and other general references in the prior art are all cognizant of the use of nickel hydroxide as a positive electrode in nickel cadmium cells as well as nickel metal hydride cells. Moreover, additives to the nickel hydroxide to enhance cell performance and capacity are known.

U.S. patent application Ser. No. 07/714,963 filed Jun. 13, 1991, now abandoned, and assigned to the same assignee as the subject application, discloses the use of cobalt as an additive to enhance the performance of positive nickel hydroxide electrodes, the contents of which are specifically incorporated herein by reference. This application relates to both nickel cadmium electrochemical cells as well as to nickel metal hydride electrochemical cells. Nonetheless, increasing emphasis is being placed on the nickel metal hydride electrochemical cells as replacements for nickel cadmium cells due to environmental concerns relating to cadmium. Thus, the use of cadmium in any capacity, including as an additive, in electrochemical cells is being discouraged. Consequently, additive schemes which are applicable to nickel cadmium cells may or may not be equally applicable to nickel metal hydride cells due to the difference in the operation of such cells as further explained below. Consequently, there is still a need for enhancing the performance and capacity factors of nickel metal hydride electrochemical cells, particularly of the AB5-type.

SUMMARY OF THE INVENTION

It is, therefore, one object of the present invention to provide an improved nickel hydroxide positive electrode for nickel metal hydride rechargeable electrochemical cells.

It is another object of the present invention to provide such a positive nickel hydroxide electrode having enhanced capacity.

Yet another object of the present invention is to provide an improved nickel hydroxide positive electrode in sintered form for use in nickel metal hydride cells, in particular of the AB5-type.

To achieve the foregoing and other objects and advantageous and in accordance with a purpose of the present invention, as embodied and broadly described herein, a positive electrode for use in a rechargeable nickel metal hydride cell is provided. The electrode includes an electrically conductive substrate and an electrochemically active material having nickel hydroxide carried by the substrate. A calcium-containing compound is deposited onto the active material to enhance performance thereof.

BRIEF DESCRIPTION OF THE DRAWINGS

The accompanying drawings which are incorporated in and form a part of the specification illustrate preferred embodiments of the present invention, and together with a description, serve to explain the principles of the invention. In the drawings.

DETAILED DESCRIPTION OF THE PREFERRED EMBODIMENTS

Figure 1:
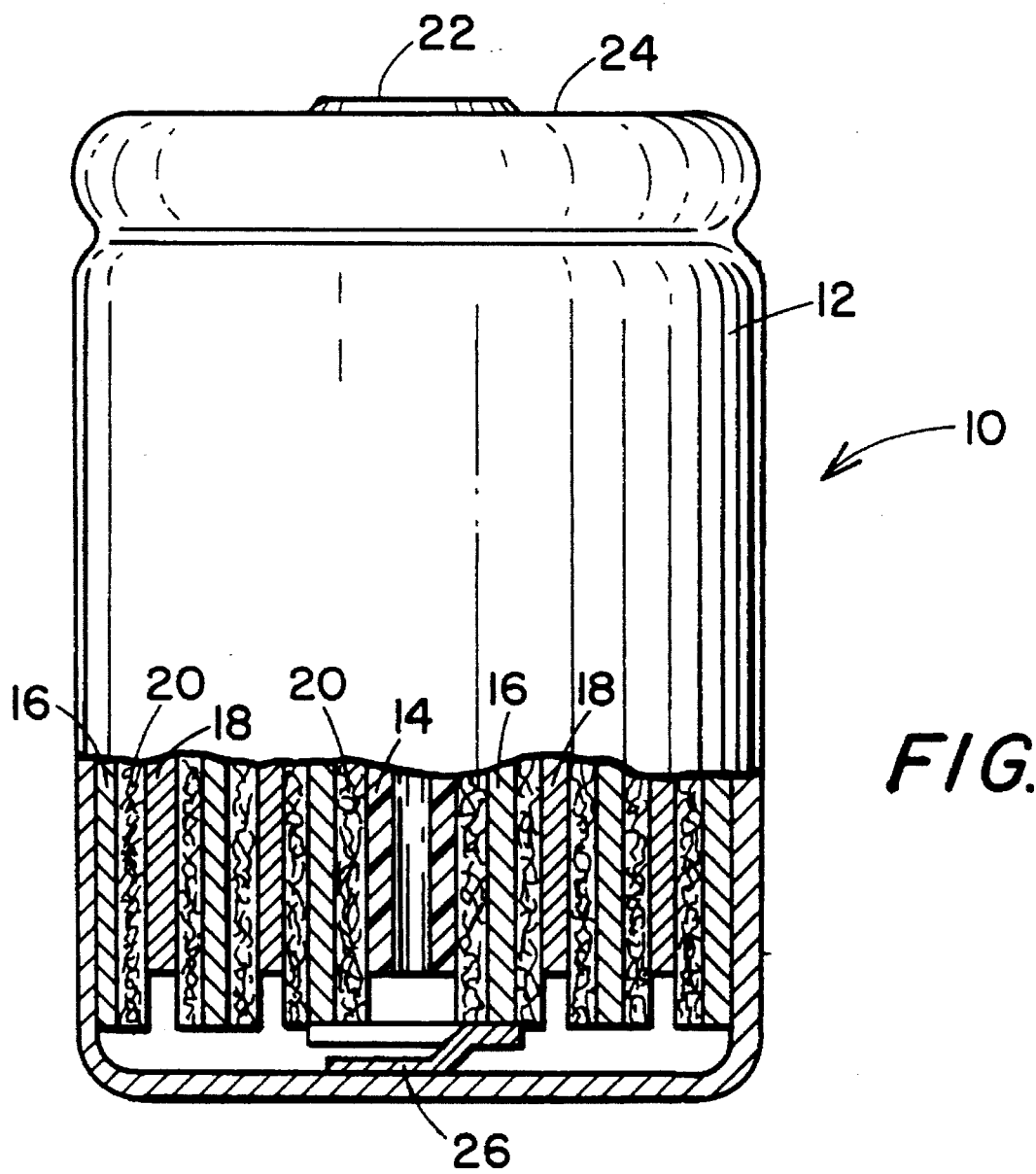
FIG. 1 is a schematic representation of a typical cylindrical sealed electrochemical cell employing the positive electrode of the present invention.

The present invention is particularly applicable to sintered positive electrodes and has applicability as well to pasted or extruded positive electrodes. The present invention adds calcium to the nickel active material of the positive electrode by coating the active material either before or after formation of the electrodes. The substrates useful with the electrode of the invention are those well-known in the Cd and metal hydride electrode art and will not be discussed in detail herein. This results in increasing the conductivity of the nickel active material as well as increasing the capacity of the electrode without increasing the cost. The present invention permits the calcium to nickel ratio to be optimized thereby increasing utilization of nickel as nickel in the plate is increased. This is especially important in cadmium-free cells, and particularly in nickel metal hydride cells which are fast replacing the nickel-cadmium rechargeable cell as indicated above.

Referring to FIG. 1, the positive electrode of the present invention, while preferably intended for use with a metal hydride negative electrode in alkaline electrochemical cells which are hermetically sealed or equipped with a resealable safety valve, may also be used in semi-sealed or flooded cells, and matched opposite different negative electrodes. While the positive electrode described herein possesses the flexibility required for winding or form electrode roll cell packs for standard cylindrical cells, such as AA, C and D size cells and the like, prismatic cells, button cells or other configurations may be produced with the electrode of the invention.

In such a typical cell 10, an outer conductive casing 12 forms the negative terminal of the cell 10. An optional spindle 14 is mounted within this cylindrical casing 12 and is formed from suitable insulating material. The spindle 14 has wound thereon in familiar jelly-roll form an assembly which includes a negative electrode 16, a positive electrode 18 constructed in accordance with the present invention, and a porous separator 20 sandwiched between the electrodes 16 and 18, the separator 20 carrying the preferred alkaline electrolyte. The positive electrode 18, which is insulated from the casing 12, is electrically connected to a positive output terminal 22 surrounded by an electrical insulator 24 through any desired and well-known internal electrical connection such as tabs (not illustrated). The negative electrode 16 is connected to the casing 12 through a lead 26, suitably attached by welding or the like to the marginal edges of the electrode 16.

The positive electrode of the present invention is useful in any electrochemical cell containing a negative metal hydride electrode. Typical alloys for the negative counterpart electrode include the so-called AB2-type as disclosed, for instance, in U.S. Pat. Nos. 4,431,561 (Ovshinsky, et al) and 4,716,088 (Reichman, et al). The typical AB2-type materials, as currently envisioned, are based on $TiNi_2$ and typically have the basic atomic structure Ni—Ti—V—Cr—Zr—X—Y where X and Y can be other elements of various selection. The invention is more preferably used in a cell containing a negative electrode having hydrogen storage alloy materials of the so-called AB5-type, a common example of which is described in the basic formula $MmNi_rCo_sMn_tAL_u$, wherein Mm represents a lanthanum-rich mischmetal, which includes various rare earth metals, and wherein $2.5<r<5.0$, $0<s<2.5$, $0<t<0.5$, and $0<u<0.5$. Hydrogen absorbing alloys of this class (i.e., AB5) are disclosed, for instance, in U.S. Pat. Nos. 4,216,274 (Bruning, et al) and 4,375,257 (Bruning, et al). Hybrid AB2/AB5 alloys may also be used with the positive electrode of the present invention, and the foregoing formula may include additional metallic constituent elements, or as substitutes for the listed elements. Finally, AB6 alloys are also known in the art and useful with the subject invention, and hybrids between AB6 and AB5 alloys may also be utilized with the positive electrodes of the present invention.

The active material of the positive electrodes of the present invention is any known nickel base material which can also include a calcium compound as a component thereof. More particularly, the preferred active materials include nickel hydroxide either alone or in combination with calcium hydroxide, particularly in a sintered electrode. In a preferred embodiment having both nickel hydroxide and calcium hydroxide in the initial electrode, subsequent calcium addition will also enhance the performance of the electrode even though calcium is originally present as part of the active material. One manner of achieving this is to pre-treat the active material with calcium prior to formation of the active electrode and then to additionally post-treat the same electrode with calcium as discussed below.

It should be noted that a variety of additives to nickel hydroxide positive electrodes in nickel metal hydride cells have been utilized in the past such as cobalt, barium, magnesium, zinc, strontium, manganese and combinations thereof. While these additives have various degrees of benefit regardless of the negative electrodes selected for use with the positive electrode of the invention, it was discovered that a calcium additive to a nickel hydroxide positive electrode used in a nickel metal hydride cell did not function particularly well with the AB2-type of negative electrode as compared to other additives. However, it was discovered that with the AB5-type negative electrode, calcium additions to the positive electrode significantly enhanced both performance and capacity of the electrochemical cell, quite the opposite case as when the AB2 negative electrode was utilized in comparatively similar cells. It was discovered that calcium tends to interfere with the performance of the AB2 alloys by interfering with the mechanism of discharging the metal hydride electrode, in that it became very rate sensitive. On the other hand, it was discovered that calcium addition to the positive electrode matched with AB5-type negative electrodes significantly enhanced the performance thereof.

In preferred general form, the electrode of the invention is prepared by forming the sintered positive electrodes, or pasted in alternate embodiments, having nickel hydroxide as the active material, and then soaking them in an aqueous solution containing calcium. Preferably, this solution is a calcium salt or calcium complex preferably in the form of an aqueous calcium acetate solution. Calcium may be present in the solution in any desired concentration but is more preferably in a concentration of $10^{-5}M$–6.5M, depending on whether the aqueous calcium solution is basic, neutral or acidic.

The soak time of the active substrate in the calcium solution depends on the concentration of the calcium. Moreover, calcium loading also depends on the number of times the electrode is dipped into the solution. In preferred form, additional calcium is loaded into the active material of the positive electrode by sequentially dipping the active material into a calcium acetate solution, drying the dipped active material, and then converting the calcium acetate to calcium hydroxide by exposing the same to a caustic solution. This is then dried, and the sequence is performed a plurality of times, preferably at least three. In this manner, a greater amount of calcium may be loaded into the active electrode substrate material. The preferred calcium loading range is from 1–10% by weight of the active mass. The positive electrodes treated with calcium in any of the manner discussed above show a significant increase in utilization of active nickel hydroxide in the electrode substrate of between 5%–10%. This increase in utilization translates directly into an increase in cell capacity which is particularly important in the nickel metal hydride AB5 environment.

Example I $C_s$ electrochemical cells were built with positive nickel hydroxide plates, alkaline electrolyte, and extruded nickel metal hydride negatives using custom-01 or custom-02 alloyed powder. Custom-01 alloy powder is a mixture having the formula $La_{0.8}Nd_{0.2}Ni_{2.5}Co_{2.4}X_{0.1}$, wherein X is Al or Si. The custom-02 alloy powder has the formula $La_{0.8}Nd_{0.2}Ni_{3.5}Co_{1.3}Al_{.2}$. In addition, the nickel hydroxide plates were varied by providing different additives thereto during testing. All of the cells of the following examples were cycle tested by charging them at 0.5 A for 2.08 hours and then discharged at 1.5 A for 0.52 hours. This cycle is referred to as the 80/60 cycle. This means that 80% of the charge input was 60% discharged. Every 50 cycles, the cells were then discharged to 0.9 V, and on the next cycle they were fully. charged for 4.33 hours, and the discharge was to 0.9 V.

In this particular Example I, sintered positive nickel hydroxide electrodes were formed by post-treating them with calcium as described above. Cells tested after 600 cycles indicated that calcium gave the best capacities and were the least dependent on charge input. Capacities were 1321 and 1386 mAH hours for the calcium cells on both the exercise and measurement cycles, respectively. This is compared to Mn and Co additives which gave high capacities but were dependent on charge input. The capacities for Mn were 1047 and 1570 mAH hours and for Co were 968 and 1636 mAH hours on the exercise and measurement cycles, respectively.

Example II

Cells were tested as described above. In this Example II, the cells were built with sintered nickel hydroxide electrodes treated with calcium, Mn, and a mixture thereof using custom-01 nickel metal hydride negatives. After 700 cycles, the test indicated that a calcium post-treatment additive gave excellent performance in that calcium provided 1620 and 1799 mAH hours on both exercise and measurement cycles, respectively.

Example III

In this example, the cells were also tested as above. In these particular cells, an attempt was made to maximize $C_s$ cell capacity using calcium post-treatment. Calcium treated positive sintered nickel hydroxide electrodes were built using zero, one, two and three calcium dip treatments as described above. The cells utilized the custom-02 negative metal hydride electrodes. After 352 cycles, cells having the three calcium treatments were 631 mAH hours higher than the cells with untreated positive electrodes. As the calcium treatment level increased in numbers from zero to 3, so did the capacity of the total cells.

Example IV

In this series of tests, it was determined to test the effect of pretreatment with the additives indicated in Example I on sintered nickel hydroxide electrodes. $C_s$ cells built with the positive electrode indicated in Example I and using custom-01 nickel metal hydride negatives were tested. After 500 or 600 cycles, both cobalt and calcium pretreatments showed the best performance. These cell tests used the AB5-type metal hydride alloys for the metal hydride negative.

Example V

In this particular example, AA cells were built with nickel metal hydride negative electrodes having the AB2 alloy. A series of positive electrodes were built having no treatment, calcium treatment, cadmium treatment and cobalt treatment. In this particular test, calcium addition again improved the performance of the overall cell compared to no additives. However, the improvement was not as nearly significant as the cell containing the cobalt additive. This is believed to be due to the calcium interference mechanism with AB2 alloys as discussed above.

Example VI

In this next test, 4/3 A cells were built utilizing an AB5 negative electrode and a sintered nickel hydroxide positive electrode having a series of different post-treatment additives. These included positive electrodes post-treated with cobalt acetate, manganese acetate, calcium acetate, zinc acetate, cobalt nitrate, cadmium, and a control with no post-treatment. After 8 hours of input with a 0.220 A charge and a 2.200 A discharge, the post-treated calcium acetate cell achieved the highest capacity of about 1.38 AH. The remaining post-treated additives in descending order of achieved capacities were the cadmium, the manganese acetate, the cobalt nitrate, the cobalt acetate, the zinc acetate, and finally the control cell with no post-treatment, which achieved a capacity of 1.10 AH.

As can be seen from the above, sintered positive electrodes can be formed having increased cell capacity and charge retention by forming the electrodes and subsequently treating them to coat the active material with calcium hydroxide. In the present invention, calcium is dispersed on the outer layers of the active material in both sintered and pasted electrodes, although the sintered electrodes responded the best to this particular additive. This calcium coating process is preferably accomplished chemically in any number of different ways, each of which yield calcium hydroxide coating the active material of the cell. It has also been found that a plurality of coatings increase, respectively, the capacity of the overall cell. It has also been found that this particular invention is more preferably useful when used in a nickel metal hydride cell having a negative electrode of the AB5-type, rather than the AB2-type.

The positive electrodes treated with calcium in the manner of the present invention to thoroughly coat the active material in the electrode show substantial increase in utilization as well as charge retention of the nickel hydroxide. This increase in utilization and retention translates directly to an increase in cell capacity as clearly illustrated in the examples provided above. This increase in cell capacity is obtained without making major changes to the electrode structure or the electrochemical arrangement or incurring significant costs, thereby allowing the basic electrodes already presently in use to be enhanced without significantly changing manufacturing techniques or increasing manufacturing costs.

The foregoing description and the illustrative embodiments of the present invention have been described in detail in varying modifications and alternate embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

The embodiments of the invention in which an exclusive property or privilege is claimed are defined as follows:

1. A positive electrode for use in a rechargeable nickel metal hydride cell comprising:

an electrically conductive substrate;

an electrochemically active material comprising nickel hydroxide carried by said substrate; and a calcium-containing compound deposited onto said active material.

2. The electrode as claimed in claim 1, wherein said calcium-containing compound comprises calcium hydroxide.

3. The electrode as claimed in claim 2, wherein said calcium hydroxide is chemically precipitated onto said active material by dipping said active material into an aqueous neutral or acidic solution of a calcium salt or calcium complex having a calcium concentration of about $10^{-5}M$-$6.5M$.

4. The electrode as claimed in claim 3, wherein said calcium hydroxide is formed by dipping said active material into an aqueous calcium acetate solution, drying the dipped active material, and converting the calcium acetate to calcium hydroxide.

5. The electrode as claimed in claim 4, wherein said active material is dipped a plurality of times to increase the amount of calcium hydroxide deposited thereon.

6. The electrode as claimed in claim 2, wherein said calcium hydroxide is chemically precipitated onto said active material by dipping said active material into an aqueous base solution of calcium hydroxide having a calcium concentration of $10^{-3}$ to $^{-5}M$.

7. The electrode as claimed in claim 1, wherein said electrochemically active material comprises a mixture of nickel hydroxide and calcium hydroxide.

8. The electrode as claimed in claim 1, wherein said substrate and active material are in the form of a sintered electrode.

9. A positive electrode for use in a rechargeable nickel metal hydride cell comprising:

a current collecting substrate;

an electrochemically active material carried by said substrate and comprising nickel hydroxide; and a layer of calcium hydroxide deposited onto said electrochemically active material after physical formation of said electrochemically active material in said substrate.

10. The electrode as claimed in claim 9, wherein said active material comprises a mixture of nickel hydroxide and calcium hydroxide.

11. The electrode as claimed in claim 9, wherein said additional layer of calcium hydroxide is chemically deposited onto said active material.

12. The electrode as claimed in claim 9, wherein said current collector substrate and said electrochemically active material are in the form of a sintered electrode.

13. A positive sintered electrode for use in a rechargeable nickel metal hydride cell comprising:

electrically conductive substrate means;

an electrochemically active material comprising nickel hydroxide and calcium hydroxide precipitated onto said substrate means; and an additional layer of calcium hydroxide deposited onto said active material.

* * * * *